US008600968B2

(12) United States Patent  
Holenstein et al.

(10) Patent No.: US 8,600,968 B2  
(45) Date of Patent: Dec. 3, 2013

(54) PREDICTIVELY SUGGESTING WEBSITES

(75) Inventors: Roman Holenstein, Redmond, WA (US); Qing Chang, Redmond, WA (US); Zhenghao Wang, Redmond, WA (US); Ravi Shahani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 214 days.

(21) Appl. No.: 13/089,996

(22) Filed: Apr. 19, 2011

(65) Prior Publication Data

US 2012/0271805 A1 Oct. 25, 2012

(51) Int. Cl.  
*G06F 17/30* (2006.01)  
*G06F 7/00* (2006.01)

(52) U.S. Cl.  
USPC .......................... 707/706; 707/721; 707/751

(58) Field of Classification Search  
USPC ........................................ 707/706, 721, 751  
See application file for complete search history.

(56) References Cited

U.S. PATENT DOCUMENTS

| | | | |
|---|---|---|---|
| 6,567,797 B1 * | 5/2003 | Schuetze et al. | 707/999.003 |
| 7,310,632 B2 | 12/2007 | Meek et al. | |
| 7,680,785 B2 | 3/2010 | Najork | |
| 8,244,740 B2 * | 8/2012 | Gruenhagen et al. | 707/751 |
| 2005/0288954 A1 * | 12/2005 | McCarthy et al. | 705/1 |
| 2008/0071774 A1 | 3/2008 | Gross | |
| 2009/0055369 A1 * | 2/2009 | Phillips et al. | 707/4 |
| 2009/0210806 A1 * | 8/2009 | Dodson et al. | 715/760 |
| 2010/0017383 A1 * | 1/2010 | Gaucas | 707/5 |
| 2010/0131441 A1 * | 5/2010 | Gruenhagen et al. | 706/45 |

OTHER PUBLICATIONS

Ozel, et al., "A Hybrid Web Link Prediction System", In Proceedings of 2nd International Conference on Intelligent Knowledge Systems (IKS-2005), Jul. 6-8, 2005.  
Snopek, et al., "Web Access Predictive Models", "In International Conference on Computer Systems and Technologies—CompSysTech' 2005", vol. 4, 4 pages.  
Sarukkai, Ramesh R., "Link Prediction and Path Analysis Using Markov Chains", Retrieved on: Jan. 13, 2011 Available at: http://www9.org/w9cdrom/68/68.html.

* cited by examiner

*Primary Examiner* — Pavan Mamillapalli  
(74) *Attorney, Agent, or Firm* — Shook Hardy & Bacon LLP (57) ABSTRACT

Computer-readable media, computer systems, and computing methods are provided for recommending websites that are relevant to a current website to which a user has navigated. A search engine is used to track a set of websites the user has visited immediately prior to the current website, while predictive model(s) are used to generate a sequence of websites that include the current website and the tracked websites. The sequence is compared against strings of websites within a browser-history log to identify matching strings, where the matching strings include the sequence and a respective candidate website. A probability of relevance is computed from a frequency that each of the matching strings has been visited within a predefined time frame. The probability of relevance for each of the matching strings is ranked against one another to distill the highest-ranked matching strings, which are parsed to extract and present the candidate websites included therein.

19 Claims, 7 Drawing Sheets

PREDICTIVELY SUGGESTING WEBSITES

BACKGROUND

Recent trends have shown that there is more and more user-reliance on search engines to not only provide search results in response to the user's query, but to assist the user in satisfying their intents during a search session. Some ways search engines currently assist users involve correcting misspellings in queries, expanding on the subject matter of the query to generate a more diverse set of search results, and offering alternative queries to the user. This last assistive feature of search engines may also offer suggested websites in addition to alternative queries.

Specifically, conventional search-engine relies on recommendation technology to provide rudimentary mechanism(s) that present a suggested website, which the user may be interested in visiting, based on a similarity between the user's current site, or the user's current query, and another website. That is, the website being suggested to the user is based on just the single, most-recently opened website. However, this approach neglects any prior websites visited by the user during a search session and fails to take into account browsing history of other users, which may help more accurately predict the user's true interests. Accordingly, predictive model(s) that evaluate a broader set of inputs (e.g., latest N-number of visited websites and other criteria) and perform in-depth analyses using those inputs would more effectively target users' search intents.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Embodiments of the present application introduce search-engine technology for recommending websites that are relevant to a current website to which a user has navigated. A web browser may be used to track a set of websites the user has visited immediately prior to the current website, while predictive model(s) are used to generate a sequence of websites that include the current website and the tracked websites. The sequence is compared against strings of websites within a browser-history log to identify matching strings. As used herein, the term "string" is used to represent a web page or website identifier, such as a uniform resource locator (URL) string. where the matching strings include the sequence and a respective candidate website. Candidate websites may be iteratively drawn from a listing to compete the matching strings, such that each matching string includes a different candidate website in conjunction with a shared sequence. A probability of relevance to the user's search intent is computed based on, in part, a rate at which each of the matching strings has been visited. The probability of relevance for each of the matching strings is ranked against one another to distill the highest-ranked matching strings. These highest-ranked matching strings may be parsed to extract the candidate websites included therein. The extracted candidate websites (associated within the highest-ranked matching strings) are then displayed to the user in any manner known in the pertinent field of technology.

As such, the technology introduced by embodiments of the present invention allow for employing one or more predictive models (e.g., N-gram, Naïve Bayes, etc.), which are trained from logs of browser history, to predict and suggest the next website, or set of URLs, the user may want to visit. In one instance, the predictive model(s) inspect a user's recent browser history to establish the prediction from an ongoing search session. A particular predictive model (e.g., N-gram) may take into account a temporal sequence of the recently visited websites when suggesting websites to the user, while another predictive model (e.g., Naïve Bayes) may neglect any ordering of the recently visited websites when computing probabilities for the candidate websites. In the former example, the N-gram predictive model may consider each search session as a "sentence" and each recently visited website a "word" within the sentence, thereby capturing an ordering and theme of the search session. In the latter example, the Naïve Bayes predictive model may view a predefined number of the recently visited websites as a bucket of items with no built-in ordering, thereby focusing on task(s) the user intends to carry out during search session.

In order to provide a robust selection of suggested websites, the results from the respective predictive models may be combined and ranked to find the most relevant websites. As such, use of the predictive models, individually or in concert, enables accepting a broad set of inputs (e.g., multiple websites and other criteria) and promotes performing an in-depth analysis based on the set of inputs, thus, more effectively targeting a user's search-session intent.

BRIEF DESCRIPTION OF THE DRAWINGS

Embodiments of the invention are described in detail below with reference to the attached drawing figures, wherein.

DETAILED DESCRIPTION

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Generally, embodiments of the present invention pertain to employing predictive model(s) during an ongoing search session being conducted by a user. In one embodiment a search engine may be used in tandem with the model(s), while, in another embodiment, the model(s) may be used during a non-search session. In operation, the predictive model(s) are configured to suggest websites that might be relevant to websites visited by a user or that might be related to an overarching task distilled from the visited websites.

As can be gleaned from the disclosure above, various embodiments of the present invention involve employing a mapping between candidate websites and visited websites (i.e., via predictive model(s) interacting with browser history) as well as implementing the mapping to identify appropriate candidate websites (i.e., recommended websites) as being relevant to the user's search session. Often, the recommended websites are surfaced on a user-interface (UI) display through the employment of task-based engines (e.g., decision engines, task engines, individual applications or operations, applet systems, operating systems, and task-based mobile systems), or general systems that allow a user to accomplish tasks by matching candidate websites to user intent. For simplicity of discussion, these engines and/or systems will be hereinafter referred to as "search engines."

Accordingly, one embodiment of the present invention may involve computer-readable media that support the operations of computer-executable instructions thereon. When executed, the computer-executable instructions may perform a method for predicting and presenting at least one recommended website using predictive models. Typically, the method includes the steps of monitoring an individual user's browsing history during an ongoing web browsing session and identifying a plurality of web addresses recently visited by the user during the search session. The method may further involve employing predictive model(s) to determine the recommended website(s). In an exemplary embodiment, the predictive model(s) are configured to carry out a process that includes accessing a listing of candidate websites. The probabilities of the candidate websites, respectively, being selected by the user upon visiting the plurality of web addresses are computed. These probabilities may be computed as a function of browsing history compiled from, at least, a group of users. The process carried out by the predictive models may further include designating one or more of the candidate websites associated with highest-computed probabilities as the recommended website(s). The method may then involve initiating a process to present to the user the recommended website(s).

In another embodiment of the present invention, a computer system is established and configured for recommending at least one website based on websites visited by a user during a browsing session. Generally, the computer system includes a processing unit coupled to a computer-storage medium, where the computer-storage medium stores a plurality of computer software components that are executable by the processing unit. As described more fully below, the computer software components may include a search engine, a predictive model, a conditioning component, and a ranking component. Typically, the search engine is configured for navigating the user to a current website. This navigation may be triggered upon detecting a user-initiated selection of a link within a search-results page, or any other appropriate action the user carries out when interfacing with a web browser.

In addition, the predictive model may be configured for determining at least one recommended website using a process. By way of example, the process may include the following steps: generating a sequence of websites including the current website and a number of websites visited immediately prior to the current website; inspecting a log of browser history using the sequence to identify strings of websites that include the sequence as well as one of a listing of candidate websites; and counting occurrences over a predefined time frame within the log of the indentified strings of websites, respectively. The process may further involve associating probabilities with the indentified strings of websites, respectively. Typically, the probabilities are derived based on the occurrences of the indentified strings of websites, respectively. The conditioning component may be implemented, in embodiments, for conditioning the probabilities using one or more criteria (e.g., browsing behavior drawn from a profile of the user, a time of day that the user-initiated selection is detected, and/or user preferences drawn from a profile of the user). The ranking component may be implemented for, in embodiments, using the conditioned probabilities of the identified strings of websites to distill one or more of the candidate websites that are highest ranked. Further, the ranking component may store the highest-ranked websites as the recommended website(s) for purposes of future delivery to the user.

In yet another embodiment of the present invention, a method for discovering at least one recommended website that satisfies a user's search intents may be implemented via computerized functionality. The method may initially include recognizing the user has navigated to a current website. A set of websites the user has visited immediately prior to navigating to the current website may be accessed (e.g., inspecting a browser history within the user's profile). Also, strings of websites may be accessed from a log of browser history compiled from a group of users. Typically, the strings of websites include the current website, the set of previously visited websites, and a candidate website that is particular to a respective string.

In one instance, the strings of websites may be ranked as a function of how frequently a respective string appears within the browser history within a predefined time frame. Consequently, one or more candidate websites included within the strings of websites that are highest ranked may be identified. The highest-ranked candidate websites may then be presented to the user.

Having described an overview of embodiments of the present invention, an exemplary operating environment in which embodiments of the present invention may be implemented is described below in order to provide a general context for various aspects of the present invention.

The following discussion describes various embodiments of the present invention. Note that several of the exemplary embodiments described below are based on actual websites to make the discussion more concrete. However, aspects of the present invention should not be construed as being limited to a particular website or search session that includes a manifest of websites. That is, embodiments of the present invention may be designed to be applied to differing search-engine technologies and other various implementations/platforms of search engines.

Figure 1:
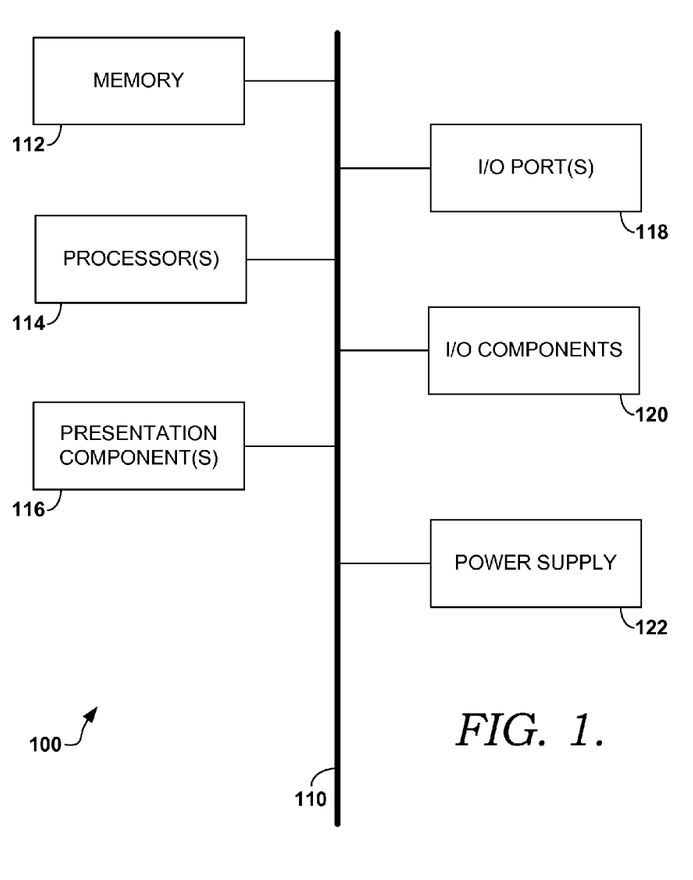
FIG. 1 is a block diagram of an exemplary computing device suitable for implementing embodiments of the invention.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
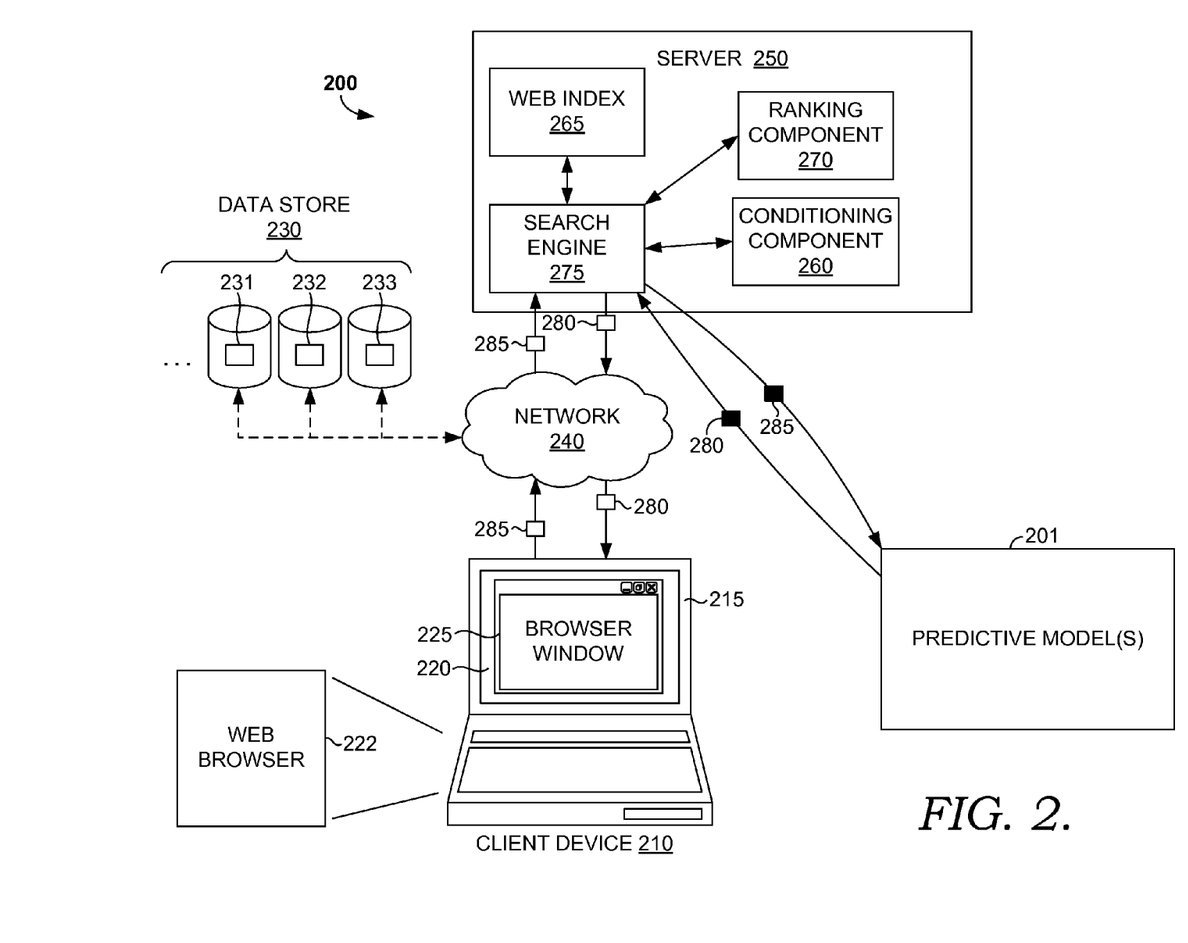
FIG. 2 is a block diagram of an exemplary system architecture of a distributed computing environment configured for use in implementing embodiments of the present invention.

Technology, introduced by embodiments of the present invention, for automatically suggesting websites (e.g., uniform resource locators (URLs) or uniform resource identifiers (URIs)) relevant to a set of recently visited websites and surfacing on a UI display the suggested websites as part of the search results or accompanying a currently visited website will now be discussed with reference to FIG. 2. In particular, FIG. 2 depicts a block diagram that illustrates an exemplary system architecture 200 of a distributed computing environment, suitable for use in implementing embodiments of the present invention. Generally, implementing embodiments of the present invention relate to predicting and presenting relevant websites. The term "websites" is interchangeably used herein with similar terms, such as URLs, URIs, web pages, online locations, etc. Accordingly, the term "websites" within the disclosure may be replaced by any of the language above, or any other web-address representative used within the public Internet or private enterprise intranet.

Further, it should be understood and appreciated that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Initially, the exemplary system architecture 200 includes a predictive model 201, a client device 210, data stores 230, a server 250, and a network 240 that interconnects each of these items. Each of the client device 210, the data stores 230, and the server 250 shown in FIG. 2, may take the form of various types of computing devices, such as, for example, the computing device 100 described above with reference to FIG. 1. By way of example only and not limitation, the client device 210 and/or the server 250 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Typically, each of the devices 210 and 250 includes, or is linked to, some form of computing unit (e.g., central processing unit, microprocessor, etc.) to support operations of the component(s) running thereon (e.g., search engine 275, predictive model 201, and the like). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 210 and 250 to enable each device to perform communication-related processes and other operations (e.g., accessing the data store 230 or running a loop on the predictive model 201 to generate suggested sites 280). In another instance, the computing unit may encompass a processor (not shown) coupled to the computer-readable medium accommodated by each of the devices 210 and 250.

Generally, the computer-readable medium includes physical memory that stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Also, beyond processing instructions, the processor may transfer information to and from other resources that are integral to, or disposed on, the devices 210 and 250. Generally, resources refer to software components or hardware mechanisms that enable the devices 210 and 250 to perform a particular function. By way of example only, the resources accommodated by the server 250 may include one or more of the following: predictive model(s) 201; a conditioning component 260; a web index 265; a ranking component 270; and the search engine 275.

The client device 210 may include an input device (not shown) and a presentation device 215. Generally, the input device is provided to receive input(s) affecting, among other things, a presentation of the search results in a browser window 225 surfaced at a UI display area 220. Illustrative devices include a mouse, joystick, key pad, microphone, I/O components 120 of FIG. 1, or any other component capable of receiving a user input and communicating an indication of that input to the client device 210. By way of example only, the input device facilitates entry of a query (e.g., navigation event to a current website 285) and controls the location of a selection tool (e.g., mouse pointer) hovering over the search results that are responsive to the query.

In embodiments, the presentation device 215 is configured to render and/or present the UI display 220 thereon. The presentation device 215, which is operably coupled to an output of the client device 210, may be configured as any presentation component that is capable of presenting information to a user, such as a digital monitor, electronic display panel, touch-screen, analog set top box, plasma screen, audio speakers, Braille pad, and the like. In one exemplary embodiment, the presentation device 215 is configured to present rich content, such as the browser window 225 that includes a display area populated with search results (e.g., digital images) accompanied by suggested websites. In another exemplary embodiment, the presentation device 215 is capable of rendering other forms of media (e.g., audio signals). In yet another exemplary embodiment, the presentation device 215 may present suggested websites (e.g., descriptions of and links to websites) in proximity with content of a currently viewed web page, as more fully discussed below with reference to FIGS. 5 and 6.

The data store(s) 230 are generally configured to store information associated with user-submitted queries, user profiles, search results, recorded search behavior, and/or data generated from ongoing search sessions based on user interaction with the web browser 222, discussed below. In various embodiments, such information may include, without limitation, recorded browsing behavior 231 (e.g., query logs, related searches list, etc.) of an individual user or based on a group of users (e.g., society in general), user preferences 232 drawn from a profile of the user (e.g., log of search interactions and settings established with the search engine 275), a time of day 233 of the search session (e.g., distinction between work hours vs. evening hours that a user-initiated selection of a link is detected), and other information that pertains to embodiments of the present invention. In addition, the data store(s) 230 may be configured to be searchable for suitable access of the stored information. For instance, the data store(s) 230 may be searchable for one or more URLs previously entered or currently used by the user. It will be understood and appreciated by those of ordinary skill in the art that the information stored in the data store(s) 230 may be configurable and may include any information relevant to the execution of the search engine 275. The content and volume of such information are not intended to limit the scope of embodiments of the present invention in any way. Further, though illustrated as single, independent components, the data store(s) 230 may, in fact, be a plurality of databases, for instance, a database cluster or cloud, portions of which may reside on the client device 210, the server 250, another external computing device (not shown), and/or any combination thereof.

This exemplary system architecture 200 is but one example of a suitable environment that may be implemented to carry out aspects of the present invention and is not intended to suggest any limitation as to the scope of use or functionality of the invention. Neither should the illustrated exemplary system architecture 200 be interpreted as having any dependency or requirement relating to any one or combination of the client device 210, the data stores 230, the server 250, the predictive model 201, and components 260, 265, 270, and 275, as illustrated. In some embodiments, one or more of the components 260, 265, 270, and 275 may be implemented as stand-alone devices. In other embodiments, one or more of the components 260, 265, 270, and 275 may be integrated directly into the server 250, or on distributed nodes that interconnect to form the server 250. It will be understood by those of ordinary skill in the art that the components 260, 265, 270, and 275 (illustrated in FIG. 2) are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and, metaphorically, the lines would more accurately be grey or fuzzy. Further, although some components of FIG. 2 are depicted as single blocks, the depictions are exemplary in nature and in number and are not to be construed as limiting (e.g., although only one predictive model 201 is shown, many more may be communicatively coupled to the search engine 275, the data store 230, or directly to the web browser 222).

Further, the devices of the exemplary system architecture may be interconnected by any method known in the relevant field. For instance, the server 250 and the client device 210 may be operably coupled via a distributed computing environment that includes multiple computing devices coupled with one another via one or more networks 240. In embodiments, the network 240 may include, without limitation, one or more local area networks (LANs) and/or wide area networks (WANs). Such networking environments are commonplace in offices, enterprise-wide computer networks, intranets, and the Internet. Accordingly, the network is not further described herein.

In operation, the components 260, 265, 270, and 275 are designed to perform a process for recommending suggested website(s) 280 using the predictive model(s) 201 that includes, at least, the following steps: generating a sequence of websites composed of the current website 285 and a number of websites (e.g., utilizing the browsing behavior 231) visited immediately prior to the current website 285; inspecting a log of browser behavior 231 using the sequence to identify strings of websites that include the sequence as well as one of a listing of candidate websites (e.g., persisted within the data store 230); counting occurrences over a predefined time frame within the log of the indentified strings of websites, respectively; and associating probabilities with the indentified strings of websites, respectively. Typically, the probabilities are derived based on, in part, the occurrences of the indentified strings of websites, respectively. To accomplish the process of recommending suggested website(s) 280, the components 260, 265, 270, and 275 are triggered to perform various procedures and to interact with the data store 230, the web browser 222, and the predictive model(s) 201. As more fully discussed below, the search engine 275 navigates the user to the current website 285 upon detecting a user-initiated selection of a link within a search-results page. In embodiments, the predictive model(s) 201 determine the recommended website(s) 280 using one or more processes. The conditioning component 260 conditions the probabilities computed by the predictive model(s) 201 using one or more criteria. This criteria may be extracted from the data stores 230 or pulled on demand from the client device 210. The ranking component 270 may employ the conditioned probabilities of the identified strings of websites to distill one or more of the candidate websites 280 that are highest ranked. Further, in some instances, the ranking component 270 stores or passes back to the search engine 275 the highest-ranked websites as the suggested website(s) 280. The search engine 275 may then initiate rendering the suggested websites 280 within the browser window 225 to assist the user in successfully satisfying their searching intents.

Figure 4:
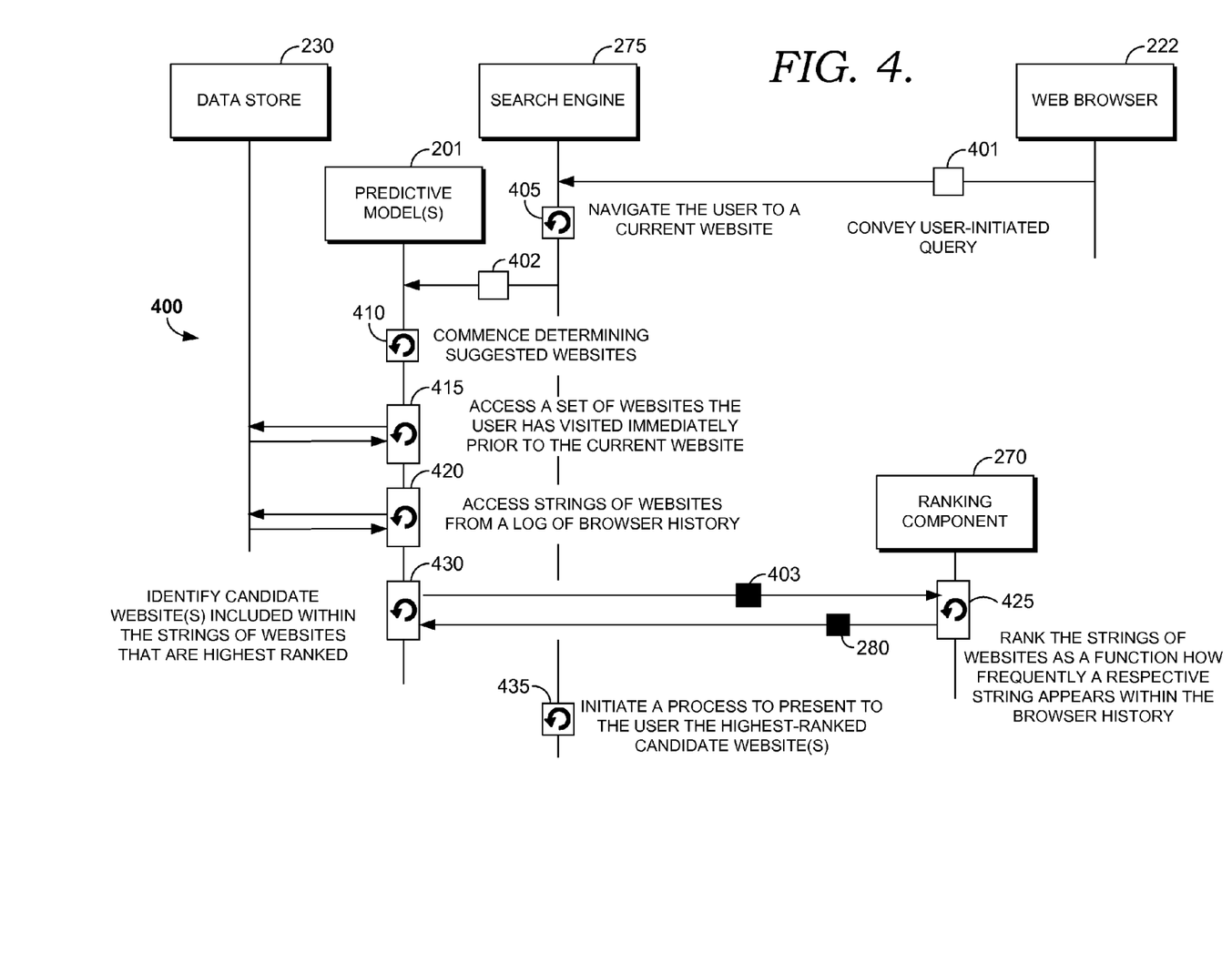
FIG. 4 depicts an operational flow diagram illustrating a high-level overview of a technique for predicting and suggesting websites using a predictive model, in accordance with embodiments of the present invention.

With reference to FIGS. 2 and 4, the functionality of an exemplary system architecture 200 will now be discussed. Initially, the operational flow diagram of FIG. 4 introduces a technique for discovering suggested websites 280 related to a current website in conjunction with previously visited websites, search results, and/or one or more queries, as implemented by the exemplary system architecture 200 shown in FIG. 2. It should be noted that like reference numerals identify like components in the various figures, such as the search engine 275 of FIGS. 2 and 4.

The process for discovering suggested websites 280 typically commences upon a user-initiated query 401 being received at the web browser 222. For example, the query 401 may be received upon entry into a search box of a toolbar or browser window 225 of a UI display 220 (see FIG. 2). Upon submission of the query 401 to the web browser 222 or any other application designed to access the Internet, the query 401 is conveyed to the search engine 275. Typically, terms or phrases may be extracted from query 401. These terms or phrases may be communicated in a request to retrieve search results from a web index 265 (see FIG. 2). In reply to the request, the web index 265 may return to the search engine 275 search results that are responsive to the query 401. These search results and/or terms or phrases extracted from the query 401 may be used as criteria for conditioning (e.g., utilizing the conditioning component 260) the suggested websites 280.

Upon delivery of the search results to the client device 210 (e.g., publishing the search results within a search-result page), the user is prompted to select one or more of the search results. The selection triggers the search engine 275 to navigate the user to a website 402 (e.g., URL, URI, a web page, or an online location), as indicated at block 405. Indicia of this website 402, which is now being currently viewed by the user, may be conveyed to the predictive model(s) 201 to be used as an input when computing the suggested websites 280.

Upon receiving indicia of the website 402, the predictive model(s) 201 may commence the process 410 of determining suggested websites 280 by scanning or crawling logs within the data stores 230 for the user's recent browser history. Or, when the desired logged information has been recently accessed, the predictive model(s) 201 may access cached data local thereto. In an exemplary embodiment, the predictive model(s) scan the logs in an attempt to access a set of websites the user has visited immediately prior to the current website, as depicted at block 415. This set of recently visited websites may be compiled with the currently viewed website 402 to generate the sequence of websites. In one instance, the sequence of websites may be a tuple, including the currently viewed website 402 and two recently visited websites (e.g., the latest two websites that share a common theme, task, or entity with the currently viewed website 402). In another instance, the sequence of websites may take into account a temporal order in which the user visited the websites, such that the websites within the sequence are arranged based on the timing at which the user navigated to the websites, respectively.

As depicted at block 420, the predictive model(s) 201 may access strings of websites from any data source operably coupled to the predictive model(s). For instance, as shown in FIG. 4, the predictive models retrieve strings of websites from the data store 230. In an exemplary embodiment, these retrieved strings of websites include the sequence of websites generated by the predictive model(s) 201. In this way, the predictive model(s) inspect a user's recent browser history to establish a prediction of websites that are relevant to an ongoing search session. A particular predictive model (e.g., N-gram), more fully discussed with reference to FIG. 3, may take into account the temporal sequence of the recently visited websites when suggesting websites to the user, while another predictive model (e.g., Naïve Bayes) may neglect any ordering of the recently visited websites when computing probabilities for the candidate websites. In the former example, the N-gram predictive model may consider each search session as a "sentence" and each recently visited website a "word" within the sentence, thereby capturing an ordering and theme of the search session. In the latter example, the Naïve Bayes predictive model may view a predefined number of the recently visited websites as a bucket of items with no built-in ordering, thereby focusing on task(s) the user intends to carry out during search sessions.

In embodiments, not all websites that the user has recently visited are considered for being grouped into the sequence of websites. For instance, because the number of distinct URLs pointing to various web pages is very large, the number of URLs may be decreased to expedite processing at the predictive model(s) 201 and to reduce noise. As such, in order to improve the results produced by the predictive model(s) 201, some of the URLs are truncated and/or clustered within the compiled browser history. Typically, truncating involves modifying URLs from pointing to specific page locators to URLs that point to generic site locators. Typically, clustering involves combining under one general URL those specific URLs having common generic site locators, such that multiple URLs having related specific page locators are considered as a single item (e.g., mapping less frequent URLs to URLs of similar/related pages on the same domain).

In one embodiment, the general URL may be identified by measuring a frequency at which each of the URLs for the specific web page forming a cluster are visited by the group of users and designating the URL linked to the most frequently visited specific web page as a representative for the cluster. In another embodiment, the URL for the general web address of the website is used as a representative for the page-specific URLs that branch from the general web address. In one instance, in order to generate the clustering of page-specific URLs, a similarity metric, or distance metric, is defined. This metric may be defined based on the terms and characters within the URL itself (e.g., edit distance) or based on comparatively analyzing language/graphics within the page content of the URLs (e.g., using a language model such as comparing word frequencies). Thus, specific URLs may be pruned (e.g., multiple sequential URLs on amazon.com would be collapsed to just one site) to general website domain addresses (e.g., token or compressed web address) as opposed to consuming resources analyzing a multitude of specific web-page-based online locations that will likely produce distorted results.

In operation, a threshold may be applied to clustering, where the threshold is typically some small integer (e.g., 5). For example, or each domain in which there are more than the threshold number of distinct URLs, the URLs are clustered into a group and the most frequently visited URL within the group is selected to be the representative. Thus, from the perspective of the predictive model(s), the other URLs that are mapped to, or replaced by, the representative URL are not separately considered.

The predictive model(s) 201 may rely upon the conditioning component 260 to provide additional criteria that may help target the suggested websites 280 to the user's true intent of a search session. These criteria may be used as inputs to one or more of the predictive models 201, where the inputs may be broader or narrower in scope than the user's recently visited websites. By way of example, the inputs may include the following: a time of day that the user selected a link on a search-results page, an identity of the user, and retrieved user-specific information as requested by the predictive models 201. The time of day that the user is conducting the search session may also be important, as users tend to look for different things at different times of the day (e.g., working hours vs. after-work hours).

Further, the conditioning component 260 may limit a time frame (e.g., hour, day, week, or month) in which related websites may be considered by the predictive model(s) 201. In this way, the data employed by the predictive model(s) 201 may be confined to just the user's latest behavioral data. Even further, browser history beyond the sequence of visited websites may be considered as a conditioning input to better tailor the suggested websites to the user. Further yet, additional attributes of the user (e.g., maintained within a user profile) may be incorporated within the computation carried out by the predictive model(s) 201 in order to reflect preferences of the user. As such, the conditioning inputs serve as a snapshot of user intent during an ongoing search session and, consequently, serve to discover those websites the user has a highest probability of visiting next.

Returning to FIG. 4, as depicted at operation 430, the predictive model(s) 201 may identify candidate websites within the strings of websites that are highest ranked. Generally, the strings of websites accessed by the predictive model(s) included one of a multitude of predefined, candidate websites. These candidate websites may be stored within a listing maintained and updated at the data store 230. Advantageously, the candidate websites limit the number of possible combinations of URLs that the predictive model(s) consider when computing the suggested websites 280, thus, saving substantial processing resources. In embodiments, each of the strings of websites includes a different candidate website extracted from the list, as well as the sequence of websites. In this way, upon comparing the sequence of websites with the strings of websites, the strings of websites matching the sequence of websites may be inspected to indentify the candidate websites 403 incorporated therein.

Indicia of these identified candidate websites 403 may be communicated to the ranking component 270. Upon receipt, the ranking component 270 implements an operation 425 for ranking the strings of websites and/or the identified candidate websites 403 as a function of how frequently a respective string and/or identified candidate website 403 appears within the browser history 233. In one embodiment, the ranking component 270 may consider context of the ongoing search session when calculating the ranking. In another embodiment, the ranking component 270 may consider a predefined hierarchical directory of preferred websites to select the highest-ranked websites from the identify candidate websites 403. In yet another embodiment, the ranking component 270 may be configured to prefer top-level websites over specific web pages when ranking the candidate websites 403, as top-level websites are often considered more compelling than specific web pages. Generally, the ranking component 270 may be trained over time to more accurately predict websites that the user considers helpful. By way of example, training may involve reviewing user feedback (e.g., selection and nonselection of suggested websites presented to the user).

In other embodiments, the ranking component 270 may rank the candidate websites in accordance with a value of the probabilities computed therefor. These probabilities are typically calculated by the predictive model(s) 201, as more fully discussed below, and are typically based, in part, at a rate at which a tracked group of users has navigated to a particular candidate website upon previously visiting the websites enumerated within the sequence of websites. Upon, identifying the candidate web sites that are the highest ranked, the ranking component 270 may select a number of the highest-ranked candidate websites and designate them as the suggested websites 280. The predictive model(s) may then convey the suggested websites 280 to the search engine 275 for rendering on the browser window 225 surfaced on the UI display 220, as depicted at block 435 of FIG. 5. In one instance, the search engine 275 may filter the suggested websites 280 as a function of a size of a display area allocated for surfacing the suggested websites 280. In another instance, presenting the suggested website 280 comprises at least one of the following: surfacing the suggested websites on a drop-down menu of a toolbar; surfacing the suggested website 280 within a display area alongside content associated with the current website 402; and integrating the suggested websites 280 within a search-result page.

Figure 3:
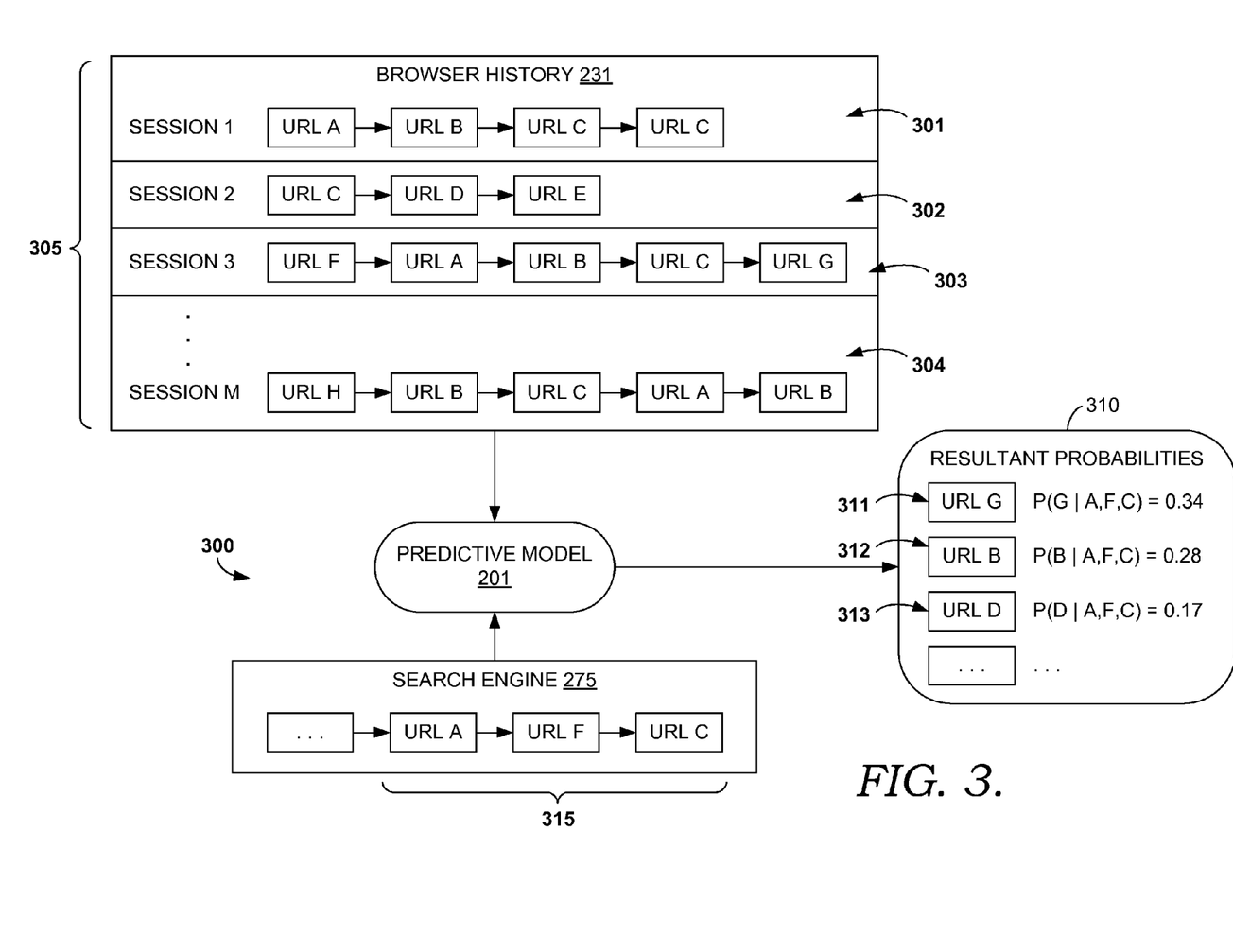
FIG. 3 is a block diagram of an inter-component communication scheme within the exemplary system architecture of FIG. 2, in accordance with embodiments of the present invention.

Turning now to FIG. 3, a block diagram 300 is illustrated showing an inter-component communication scheme within the exemplary system architecture 200 of FIG. 2, in accordance with embodiments of the present invention. The predictive model 201 of the block diagram 300 represents an exemplary operation of an N-gram model that applies a temporal pattern to the data of the browser history 231. Initially, the predictive model 201 interfaces with the search engine 275 to request the sequence of websites 315, or URLs, recently visited by the user. In a particular instance, the sequence of websites 315 represents a tuple that includes the currently viewed website (URL C), as well as the previous two recently visited websites (URL A and URL F) that were selected by the user immediately prior to the currently viewed website. In another instance, the previous two recently visited websites are filtered based on a relationship to the currently viewed website (e.g., sharing the same task), in order to eliminate nonrelevant data.

This N-gram predictive model 201 generally takes into account the order in which the sites are visited within the sessions 301-304 being considered. That is, the prediction made by the N-gram predictive model 201 is based on an order of URLs that the user has visited based on a time of visitation. From those sessions 301-304, the N-gram predictive model 201 identifies the URL tuples that match the sequence (URL A->URL F->URL C). The number of occurrences of each of the candidate websites (e.g., URL G, URL, B, and URL D) are counted from the matching URL tuples. This counting of occurrences, over a predefined period of time, provides a set of frequencies that are used to compute the resultant probabilities P(X|tuple) 310 for the candidate websites. Upon comparing the resultant probabilities 310 against one another, those candidate websites with the highest probabilities (e.g., reference numerals 311-313) are aggregated and, potentially, presented to the user as the suggested websites.

In embodiments, the N-gram predictive model 201 may be trained based on selections of the user(s) and based on other information related to whether the suggested websites were deemed helpful. For instance, the N-gram predictive model 201 may receive feedback from the search engine that communicates whether one or more of the suggested sites is selected immediately, at another time, or not at all. This training facilitates calibrating the N-gram predictive model 201 in order to compute and recommend the most relevant suggestions possible. For example, calibrating may involve reconfiguring the N-gram predictive model 201 to move away from tuples and consider a different number of websites within the sequence 315.

In other instances, this temporal pattern aspect of the N-gram predictive model 201 could also be loosened by using another model, such as the Naïve Bayes model. As such, a different set of resultant probabilities attached to a different set of candidate websites may be arrived upon. Embodiments, of the present invention are configured to consider and combine the outputs from multiple models. As such, the ranking component 270, or any other software program, may run a plurality of models concurrently, generate a union of the output candidate websites from the various models, and rank the output candidate websites based on their respective resultant probabilities to provide a hierarchical order of the output candidate websites. Those output candidate websites located within the top probabilities of the hierarchical order deemed the highest ranked are designated as the suggested websites 280. Further, the ranking component 270 may be configured with logic to intelligently select one or more subject predictive models from a number of available predictive models based on any parameters inherent to the search session, such as subject matter of the query, content of the currently viewed web page, or type of data presently accessible.

Figure 5:
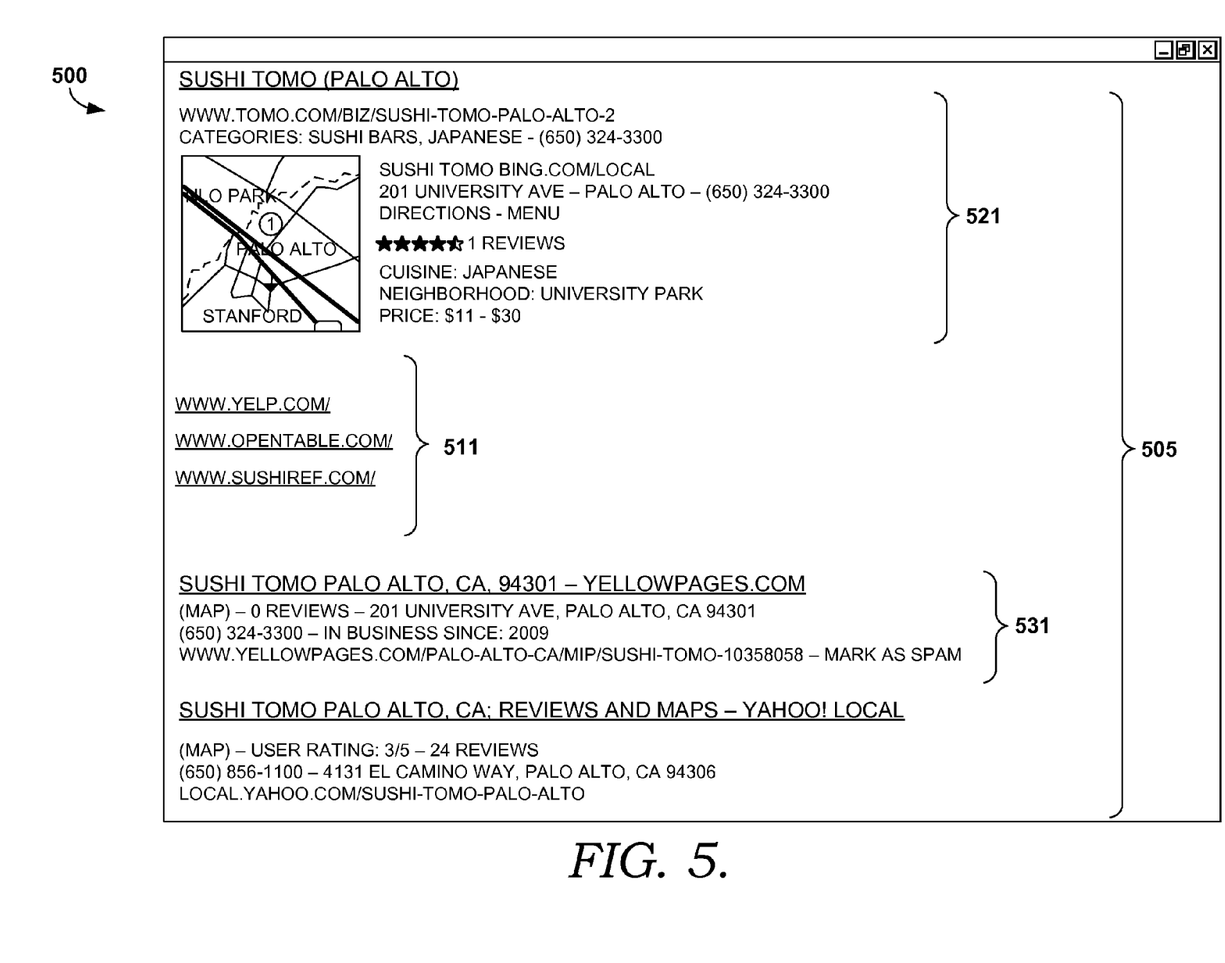
FIG. 5 is a schematic diagram depicting a first illustrative UI display that includes suggested websites surfaced concurrently with search results, in accordance with embodiments of the invention.

Turning now to FIG. 5, a schematic diagram depicting a first illustrative UI display 500 that includes a suggested website 511 surfaced concurrently with search results 521 and 531 is shown, in accordance with embodiments of the invention. In this embodiment, the user has navigated to a URL that includes search results 521 and 531. These search results may be detected by the conditioning component 260 and fed to the predictive model(s) 201 as criteria to tailor the suggested websites to the user's present intent of the search session. Further, once the predictive model(s) 201 have run, the resultant suggested websites 511 may be presented inline within the content of the search-results page. As shown a dedicated display area is allocated for surfacing the suggested websites 511.

Figure 6:
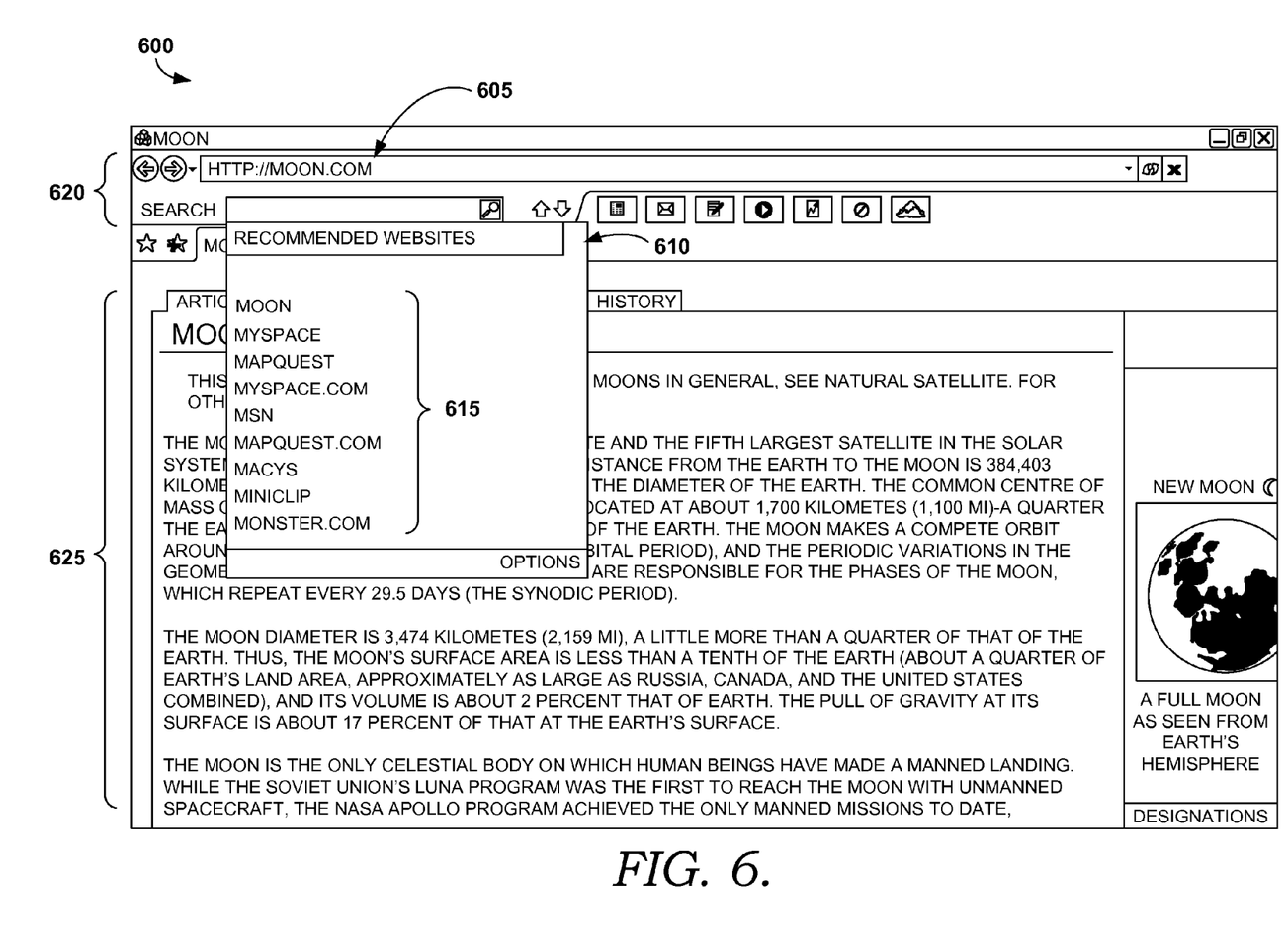
FIG. 6 is a schematic diagram depicting a second illustrative UI display that includes suggested websites surfaced within a display area, in accordance with embodiments of the invention.

With reference to FIG. 6, a schematic diagram depicting a second illustrative UI display 600 that includes suggested websites 615 surfaced within a display area 610 is shown, in accordance with embodiments of the invention. As illustrated, the user has navigated (e.g., via selecting a link on a previously visited website) to the website having the URL "moon.com" 605. This currently viewed website includes content 625 that is bounded on one side by a toolbar 620. A user-directed action on the toolbar 620 may trigger the presentation of the display area 610 that lists a selection of the suggested websites 615. The display area 610 is shown as a drop-down menu, however, the display area 610 may be a pop-up menu or other format of presentation mechanism appropriate for the search context.

Although various different configurations of the display area 610 have been described, it should be understood and appreciated that other types of suitable approaches for presenting the suggested websites 615 may be used, and that embodiments of the present invention are not limited to those pop-up or drop-down menus described herein. For instance, the suggested websites 615 may be presented to the user within the UI display 600 in a side-bar or other panel that is positioned adjacent to the content 625 of the website.

Figure 7:
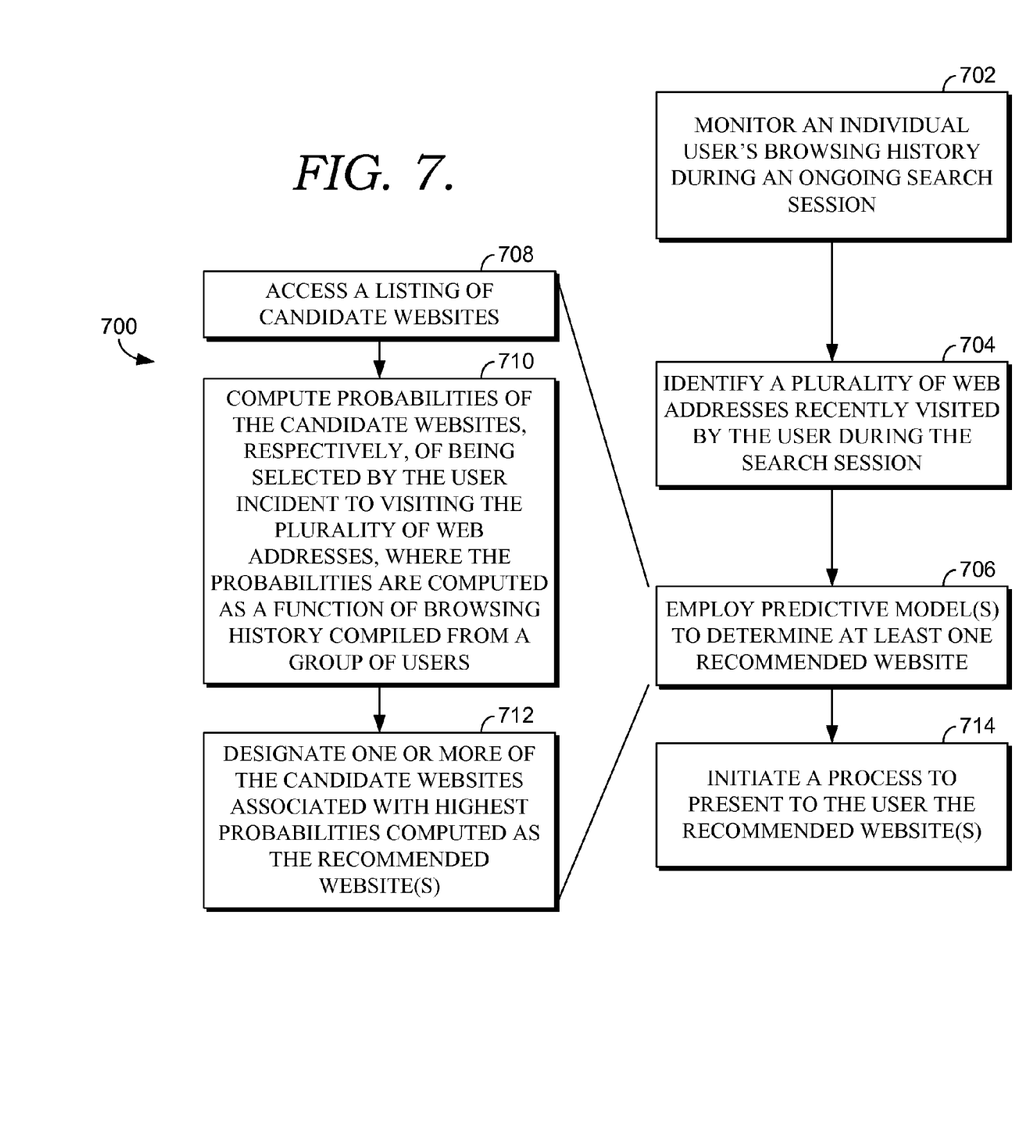
FIG. 7 is an overall flow diagram of a method for predicting and presenting at least one recommended website using predictive models, in accordance with embodiments of the invention.

Turning now to FIG. 7, an overall flow diagram of a method 700 for predicting and presenting at least one recommended website using predictive models is shown, in accordance with embodiments of the invention. Although the terms "step" and/or "block" may be used herein to connote different elements of methods employed, the terms should not be interpreted as implying any particular order among or between various steps herein disclosed unless and except when the order of individual steps is explicitly described. Initially, the method 700 includes the steps of monitoring an individual user's browsing history during an ongoing search session (see block 702) and identifying a plurality of web addresses recently visited by the user during the search session (see block 704).

The method 700 may further involve employing predictive model(s) to determine the recommended website(s), as depicted at block 706. In an exemplary embodiment, the predictive model(s) are configured to carry out a process that includes accessing a listing of candidate websites, as depicted at block 708. The probabilities of the candidate websites, respectively, being selected by the user upon visiting the plurality of web addresses are computed at block 710. As discussed above, these probabilities may be computed as a function of browsing history (e.g., utilizing the data store(s) 230 of FIG. 2) compiled from, at least, a group of users and the individual user. The process carried out by the predictive model(s) may further include, as depicted at block 712, designating one or more of the candidate websites associated with highest-computed probabilities as the recommended website(s). The method 700 may then involve, as depicted at block 714, initiating a process to present (e.g., utilizing the browser window 225 of FIG. 2) to the user the recommended website(s).

Accordingly, more valuable suggested websites are provided to a user because the suggested websites are generated by considering (e.g., utilizing the predictive models 201 of FIG. 2) multiple inputs (e.g., various previously visited URLs) from the user's search session in concert with prerecorded baseline search strings, as opposed to simply looking at the currently viewed web page. It should be noted that various embodiments of the present invention have been described to be illustrative rather than restrictive. Alternative embodiments will become apparent from time to time without departing from the scope of embodiments of the inventions. It will be understood that certain features and subcombinations are of utility and may be employed without reference to other features and subcombinations. This is contemplated by and is within the scope of the claims.

The invention claimed is:

1. One or more computer-storage devices having embodied thereon computer-executable instructions that, when executed, perform a method for predicting and presenting at least one recommended website using predictive models, the method comprising:
   determining that an individual user has established an ongoing search session;
   during the ongoing search session, generating a sequence of websites comprising a current website being viewed by the user and one or more additional websites visited by the user immediately prior to the current website being viewed;
   employing one or more predictive models to determine the at least one recommended website, wherein the one or more predictive models are configured to carry out a process comprising:
   (a) accessing a log of browser history to identify one or more strings of websites that match the sequence of websites, each website string containing a candidate website;
   (b) computing probabilities of the candidate websites, respectively, of being selected by the user incident to visiting the one or more additional websites, wherein the probabilities are computed as a function of browsing history compiled from, at least, a group of users; and
   (c) designating one or more of the candidate websites associated with the highest-computed probabilities as the at least one recommended website; and
   initiating a process to present to the user the at least one recommended website.

2. The computer-storage devices of claim 1, wherein the method further comprises, at some time after the user navigates to the current website, presenting the at least one recommended website on a user-interface (UI) display, wherein the current website is included within the one or more additional websites.

3. The computer-storage devices of claim 2, wherein presenting the at least one recommended website on a UI display comprises at least one of surfacing the at least one recommended website on a drop-down menu of a toolbar, surfacing the at least one recommended website within a display area alongside content associated with the current website, or integrating the at least one recommended website within a search-results page.

4. The computer-storage devices of claim 1, wherein the method further comprises:
   ranking the candidate websites in accordance with a value of the probabilities computed therefor;
   identifying the one or more candidate websites that are the highest ranked; and
   selecting for presentation a number of the one or more highest-ranked candidate websites as a function of a size of a display area allocated for surfacing the candidate websites.

5. The computer-storage devices of claim 1, the method further comprising:
   truncating URLs within the compiled log of browser history from specific page locators to generic site locators; and
   clustering URLs having common generic site locators such that multiple URLs having related specific page locators are considered as a single entity.

6. The computer-storage devices of claim 5, wherein the method further comprises:
   measuring a frequency at which each of the related specific page locators forming a cluster is visited by the group of users; and
   designating a most frequently visited specific page locator as a representative candidate website of the cluster.

7. The computer-storage devices of claim 1, wherein employing one or more predictive models to determine the at least one recommended website comprises invoking a first predictive model that computes a first probability that a subject string of websites, ending with one of the candidate websites, is relevant to the user based on, in part, a frequency in which the group of users sequentially visited the subject string of websites.

8. The computer-storage devices of claim 1, wherein employing one or more predictive models to determine the at least one recommended website comprises invoking a second predictive model that computes a second probability without regard for an ordering of websites within the subject string of websites.

9. The computer-storage devices of claim 1, wherein employing one or more predictive models to determine the at least one recommended website comprises:
   combining into a union a first probability resulting from invoking a first predictive model and a second probability resulting from invoking a second predictive model; and
   ranking values of the first and second probabilities within the union to facilitate selection of the candidate websites.

10. A computer system for recommending at least one website based on websites visited by a user during a search session, the computer system comprising a processing unit coupled to a computer-storage medium, the computer-storage medium having stored thereon a plurality of computer software components executable by the processing unit, the computer software components comprising:
    a search engine for navigating the user during an ongoing search session to a current website upon detecting a user-initiated selection of a link within a search-results page;
    a predictive model for determining the at least one recommended website using a process comprising:
    (a) generating a sequence of websites including the current website and a number of websites visited immediately prior to the current website during the ongoing search session, wherein the sequence takes into account a temporal order in which the user visited the websites;
    (b) inspecting a log of browser history using the sequence to identify strings of websites that include the sequence as well as one of a listing of candidate websites;

(c) counting occurrences over a predefined time frame within the log of the indentified strings of websites, respectively;

(d) associating probabilities with the indentified strings of websites, respectively, wherein the probabilities are derived based on the occurrences of the indentified strings of websites, respectively;

a conditioning component for conditioning the probabilities using one or more criteria; and a ranking component for using the conditioned probabilities of the identified strings of websites to distill one or more of the candidate websites that are highest ranked, and for storing the one or more highest-ranked websites as the at least one recommended website.

11. The system of claim 10, wherein the one or more criteria used for conditioning the probabilities comprise browsing behavior drawn from a profile of the user.

12. The system of claim 10, wherein the one or more criteria used for conditioning the probabilities comprise a time of day that the user-initiated selection is detected.

13. The system of claim 10, wherein the one or more criteria used for conditioning the probabilities comprise user preferences drawn from a profile of the user.

14. A computerized method carried out by a search engine running on a processor for discovering at least one recommended website that satisfies a user's search intents, the method comprising:

recognizing the user has navigated a current website during an ongoing search session;

accessing a set of websites the user has visited immediately prior to navigating to the current website during the ongoing search session;

generating a sequence of websites comprising the current website and one or more websites of the set of websites;

accessing strings of websites from a log of browser history to identify one or more strings of websites that match the sequence of websites, wherein each website string contains a candidate website;

ranking the one or more strings of websites as a function of how frequently a respective string appears within the browser history within a predefined time frame;

identifying one or more candidate websites included within the one or more strings of websites that are highest ranked; and presenting to the user the one or more highest-ranked candidate websites.

15. The method of claim 14, wherein the log of browser history is collected from a profile of the user.

16. The method of claim 14, wherein the log of browser history is compiled from a group of users.

17. The method of claim 14, further comprising, upon detecting a user-initiated selection of a highest-ranked candidate website, navigating away from the current website to the highest-ranked candidate website.

18. The method of claim 17, further comprising using the user-initiated selection to train a predictive model that is responsible for ranking the strings of websites as a function of frequency.

19. The method of claim 14, wherein user interactions during the ongoing search session are formed as a tuple that includes the current website and two websites visited immediately prior to the current website during the ongoing search session, and wherein the one or more strings of websites are composed of the tuple and a particular candidate website iteratively selected from a predetermined listing of candidate websites.

* * * * *